United States Patent
Lüscher et al.

(10) Patent No.: US 10,509,192 B2
(45) Date of Patent: Dec. 17, 2019

(54) CAMERA SYSTEM COMPRISING A ZOOM LENS AND A LINEAR ENCODER

(71) Applicants: Marco Lüscher, Brugg (CH); Veroljub Maksimovic, Biberist (CH)

(72) Inventors: Marco Lüscher, Brugg (CH); Veroljub Maksimovic, Biberist (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 523 days.

(21) Appl. No.: 14/383,483

(22) PCT Filed: Sep. 21, 2012

(86) PCT No.: PCT/EP2012/068708
§ 371 (c)(1),
(2) Date: Sep. 5, 2014

(87) PCT Pub. No.: WO2013/135313
PCT Pub. Date: Sep. 19, 2013

(65) Prior Publication Data
US 2015/0077544 A1    Mar. 19, 2015

(30) Foreign Application Priority Data
Mar. 13, 2012 (EP) .................................... 12159332

(51) Int. Cl.
*G02B 7/04* (2006.01)
*G02B 15/14* (2006.01)
(Continued)

(52) U.S. Cl.
CPC .............. *G02B 7/04* (2013.01); *G02B 15/14* (2013.01); *H04N 5/2254* (2013.01); *H04N 5/23296* (2013.01); *H04N 5/30* (2013.01)

(58) Field of Classification Search
CPC ........ G02B 7/04; G02B 15/14; H04N 5/2254; H04N 5/30; H04N 5/23296
See application file for complete search history.

(56) References Cited

U.S. PATENT DOCUMENTS 5,669,483 A * 9/1997 Nolan .................... B65G 21/14
                                                    198/812
5,973,788 A   10/1999 Pettersen et al.
(Continued)

FOREIGN PATENT DOCUMENTS

EP    0 553 266 B1    5/1997
EP    1 510 846 A1    3/2005
(Continued)

OTHER PUBLICATIONS

European Search Report dated Aug. 27, 2012 as received in Application No. 12159332.1.
(Continued)

*Primary Examiner* — Shawn S An
(74) *Attorney, Agent, or Firm* — Maschoff Brennan

(57) ABSTRACT

A camera system comprising a zoom lens is disclosed. The camera system may be used in a measuring apparatus, having a tube-like guide system having a tube body, which defines a tube interior and an optical axis, a sensor module disposed downstream of the guide system and an optical sensor for detecting optical radiation, at least one first carriage which has an optical assembly having at least one optical element and an optical system carrier, is arranged in a manner linearly moveable along the optical axis in the tube interior and is mounted in a manner guided substantially without play through the tube body in a plane perpendicular to the optical axis, and a first drive system for moving the first carriage along the optical axis, said first drive system being decoupled from the guide system.

21 Claims, 12 Drawing Sheets

(51) Int. Cl.
H04N 5/225 (2006.01)
H04N 5/232 (2006.01)
H04N 5/30 (2006.01)

(56) References Cited

U.S. PATENT DOCUMENTS

| | | | |
|---|---|---|---|
| 7,045,770 B2 | 5/2006 | Igaki et al. | |
| 7,064,911 B2 | 6/2006 | Soppelsa | |
| 8,681,317 B2 | 3/2014 | Moser et al. | |
| 2002/0093745 A1* | 7/2002 | Takahashi | G02B 7/10 359/696 |
| 2003/0161049 A1* | 8/2003 | Okada | G02B 7/102 359/696 |
| 2003/0218125 A1 | 11/2003 | Igaki et al. | |
| 2007/0016386 A1* | 1/2007 | Husted | G01C 17/00 702/150 |
| 2008/0068451 A1* | 3/2008 | Hyatt | G02B 13/0065 348/36 |
| 2009/0086312 A1* | 4/2009 | Chou | G02B 7/04 359/363 |
| 2010/0176270 A1* | 7/2010 | Lau | B25J 9/1692 250/203.2 |
| 2011/0260033 A1* | 10/2011 | Steffensen | G01C 15/002 250/203.1 |
| 2012/0213503 A1* | 8/2012 | Gustaffson | H04N 5/2354 396/164 |

FOREIGN PATENT DOCUMENTS

| | | |
|---|---|---|
| JP | 52-136274 A | 11/1977 |
| JP | 01-265213 A | 10/1989 |
| JP | 05-52807 U | 7/1993 |
| JP | 2000-180692 A | 6/2000 |
| JP | 2003-153056 A | 5/2003 |
| JP | 2003-337052 A | 11/2003 |
| JP | 2004-094148 A | 3/2004 |
| JP | 2005-229728 A | 8/2005 |
| WO | 2010/148526 A1 | 12/2010 |

OTHER PUBLICATIONS

CN Search Report dated Jan. 4, 2016 as received in Application No. 201280071329.6 (English Translation).

\* cited by examiner

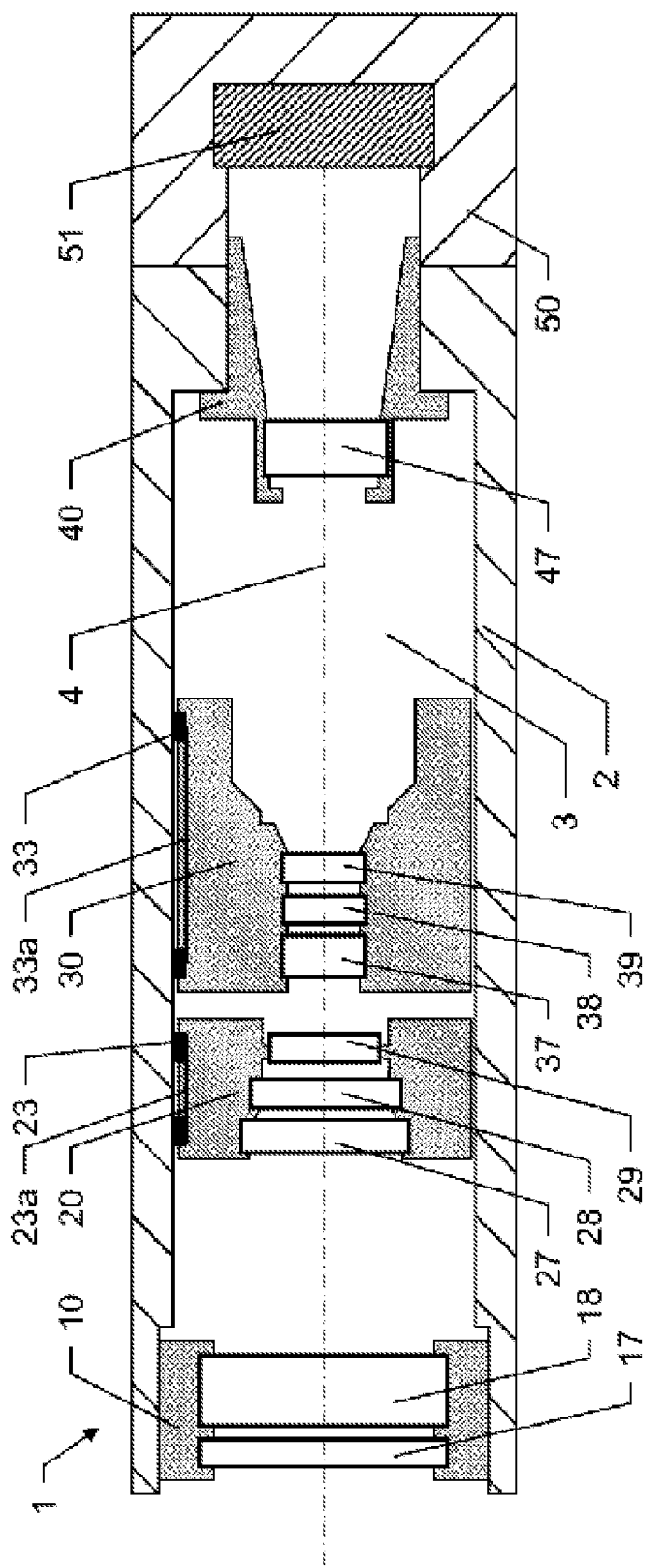

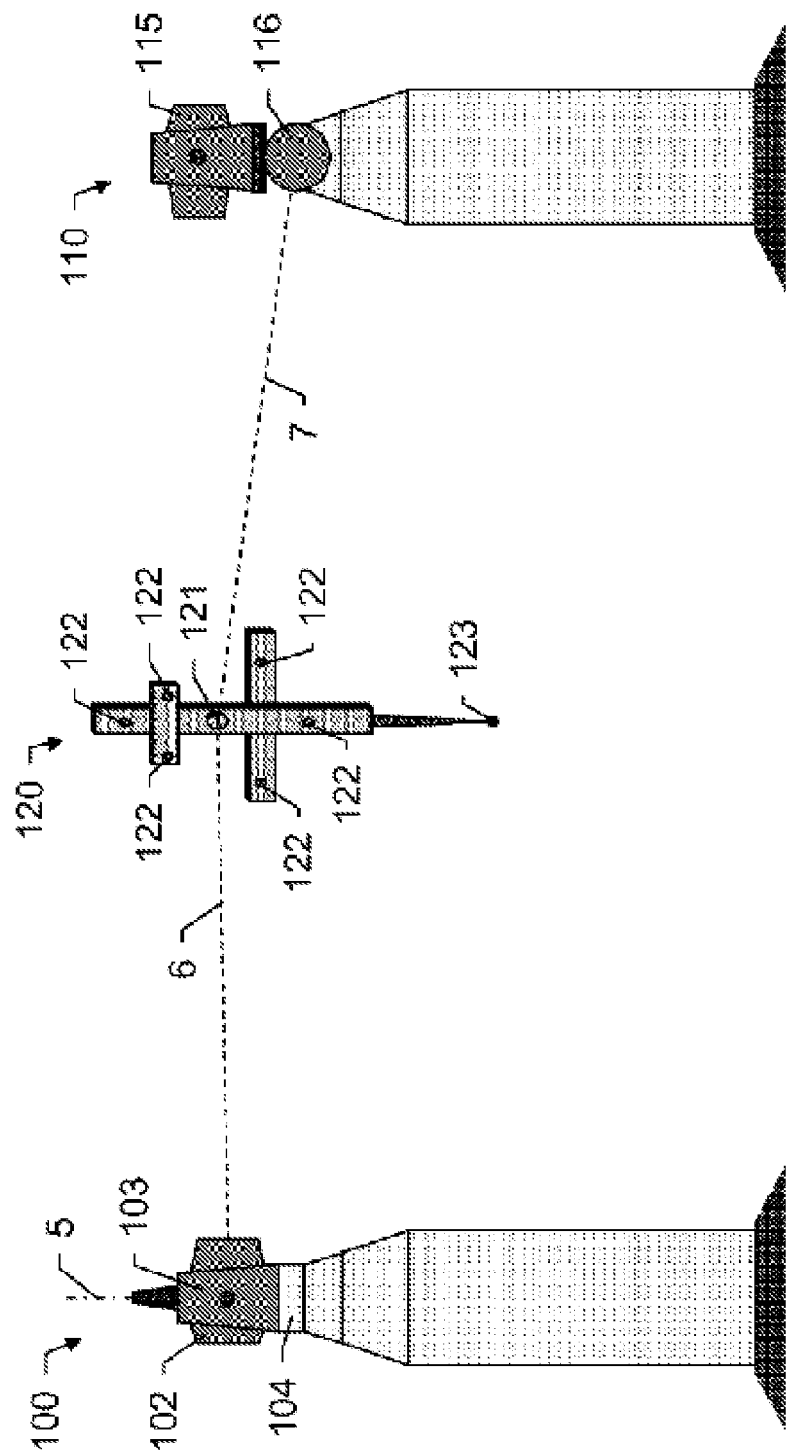

CAMERA SYSTEM COMPRISING A ZOOM LENS AND A LINEAR ENCODER

FIELD OF THE INVENTION

The present invention relates to a camera system comprising a zoom lens having movable zoom optic assemblies and a linear encoder, in particular for use in surveying devices, and also a laser tracker comprising such a camera system.

BACKGROUND

Camera systems of the present type are used above all in laser trackers. Laser trackers according to the prior art are usually embodied having an optical image acquisition unit having a two-dimensional, light-sensitive array, for example, a CCD or CID camera or a camera based on a CMOS array, or having a pixel array sensor and having an image processing unit. The laser tracker and the camera are installed one on top of another in this case in particular such that their positions are not variable in relation to one another. The camera is, for example, rotatable together with the laser tracker about its essentially vertical axis, but is pivotable up-and-down independently of the laser tracker and is therefore arranged separately from the optics of the laser beam in particular. In particular, the camera can have a fisheye lens and therefore pivoting of the camera can be avoided or is at least necessary to a restricted extent because of a very large image acquisition range of the camera. Furthermore, the camera—for example, in dependence on the respective application—can be embodied as pivotable about only one axis. The camera can also be installed in an integrated construction with the laser optics together in a shared housing.

With the acquisition and analysis of an image—by means of an image acquisition and image processing unit—of a so-called measuring aid instrument having markings, the relative location of which to one another is known, an orientation in space of an object (for example, a probe), which is arranged on the measuring aid instrument, can be concluded. Together with the determined spatial position of the target point, furthermore the position and orientation of the object in space can be precisely determined absolutely and/or in relation to the laser tracker.

The object, the position and orientation of which are measured using the mentioned measuring device, therefore does not have to be the object itself, but rather can be the measuring aid instrument. As a part of the measurement system, for the surveying, it is moved into a position which is mechanically defined in relation to the target object or is determinable during the surveying, wherein the position and optionally the orientation of the object—for example, a measuring probe—can be concluded from its surveyed position and orientation.

Such measuring aid instruments can be embodied by so-called scanning tools, which are positioned having the contact point thereof on a point of the target object. The scanning tool has markings, for example, light spots, and a reflector, which represents a target point on the scanning tool and can be targeted using the laser beam of the laser tracker, wherein the positions of the markings and the reflector in relation to the contact point of the scanning tool are precisely known. The measuring aid instrument can also be, for example, a handheld scanner, which is equipped for distance measurement, for contactless surface surveying, wherein the direction and position of the scanner measurement beam used for the distance measurement are precisely known in relation to the light spots and reflectors which are arranged on the scanner. Such a scanner is described, for example, in EP 0 553 266 A1.

An acquisition direction of the camera is progressively aligned for the determination of the orientation of the measuring aid instrument such that an image can be acquired in the direction of the tracking beam of the laser tracker. The camera can furthermore have a zoom function, wherein an enlargement stage can be set in dependence on the determined distance between laser tracker and target point or measuring aid instrument (vario-camera). Using these two adaptation functions (alignment and enlargement), the camera can therefore progressively acquire an image, in which the measuring aid instrument and in particular the light spots of the measuring aid instrument are imaged. An electronically analyzable two-dimensional image of a spatial arrangement of light spots thus results.

Such a measuring device having a laser tracker and an image acquisition unit for the determination of position and orientation of objects in space, on which light spots and reflectors are arranged, is described, for example, in U.S. Pat. No. 5,973,788.

A guide system for zoom systems is disclosed in EP 1 510 846 A1, using which optical assemblies, such as lenses or lens groups, are to be displaced along the optical axis of the zoom system. In this case, a carriage, which is implemented to accommodate an optical assembly, in particular a lens or lens group, has on its outer side multiple contact surfaces for contact on the internal diameter of a lens. A spindle curve is provided as a drive unit for a defined movement of the carriage. Since no direct feedback of the actual linear position occurs, but rather it can only be derived via counting of steps of the motor, inaccuracies can occur as a result of the aging process of the motor, if a motor step increases or decreases—even minimally—due to wear. It is also possible that—for example, due to a shock of the device—a step will be executed, which is not counted. This can have the result that a carriage is located at a different position than is assumed by the system, which can cause fuzzy images and measurement errors, on the one hand, and can also cause damage to the device, on the other hand.

SUMMARY

Some embodiments of the present invention include a camera comprising a zoom lens, that provides an improved guide system which has increased precision in the linear positioning of the carriage.

Some embodiments of the present invention provide for such a guide system with improved, in particular more exact, position feedback.

Another embodiment is to provide a guide system for a camera of a laser tracker.

A camera system according to the invention has a zoom lens having a lens system and a camera sensor arranged downstream from the lens system, in particular a CMOS sensor. The lens system includes one or more fixed optic assemblies and one or more movable zoom optic assemblies. The lens system preferably has two fixed and two movable optic assemblies, wherein the two movable assemblies are located between the two fixed assemblies.

The movable zoom optic assemblies are each carried without play by an optics carrier. Optics carriers and optical assemblies form in each case a module in the form of a carriage in this case, wherein the carriages each have an essentially circular cross section.

The carriages are guided in a lens tube, wherein ball cages or sliding elements form the contact points or touch points with the lens tube in particular and therefore provide the axial mobility of the carriages or the zoom optic assemblies carried thereby. In the case of guiding by sliding elements, sliding elements, which are pre-tensioned by means of a pre-tension element, on the top side of the carriages ensure in this case that sliding elements, which are screwed in and turned for adjustment, are held essentially without play on the inner lateral surface of the lens tube.

A lens tube is not only to be understood as a laterally closed hollow cylinder in the meaning of the present invention. Rather, the term is to be understood functionally in the meaning of the invention in the meaning of a tubular guide system, which ensures guiding of the carriages along the optical axis. In particular, the lens tube can have, in addition to a round shape, also an ellipsoidal or polygonal shape in cross section. The lens tube can also have openings, in particular in the form of longitudinal slots, or can consist of individual longitudinal segments arranged in the direction of the optical axis, which essentially outline the shape of a hollow cylinder by their arrangement.

The carriages are each movable along the optical axis by means of a drive unit, which is decoupled from the guide system of the lens tube. The drive units have motors and movement-transmitting elements, wherein the carriages are each coupled by means of a driver to the movements of the movement-transmitting elements. The drivers fastened on the carriages ensure, in conjunction with guide longitudinal slots provided for guiding these drivers in the tube, a safeguard for the carriages against rolling twisting inside the tube guide.

The drivers are preferably embodied as a part of the carriage, i.e., for example, fixedly attached to the optics carrier, in particular screwed on, or embodied as a shared component with the optics carrier. The driver is then arranged movably, in particular by means of a ball joint, on the movement-transmitting element of the drive unit. Alternatively, the driver can also be arranged fixedly on the movement-transmitting element and movably on the carriage. The driver is guided—preferably provided with a sliding element—in a longitudinal slot of the lens tube and thus prevents twisting of the carriage in a plane parallel to the optical axis. Alternatively, the driver can be operationally linked by means of one or two magnets to the carriage, so that no opening for the driver is necessary in the tube body at this point.

Diverse variants are conceivable as motors, in particular direct-current motors or linear piezo motors come into consideration. The movement-transmitting element can be fastened, for example, on a belt, in particular a toothed belt or a flat belt, which is drivable by a direct-current motor, or can be embodied as a ceramic rod movable by a piezo motor.

According to the invention, each carriage has a position encoder element, which contains in particular an optically or capacitively acquirable position code. The position encoder element can preferably be arranged on the optics carrier, in particular in the form of a cemented-on glass scale.

Furthermore, a scanning sensor is provided, which is preferably arranged outside the tube interior on the tube body or inside the tube body. The scanning sensor is embodied in particular such that it acquires the position encoder element or the position code of the position encoder element and can generate a scanning signal derived therefrom, from which a linear position of the carriage is derivable. If the scanning sensor is arranged on the tube body, the tube body has an opening suitable for scanning the code element, in or above which the scanning sensor is arranged, and which can be covered completely by the scanning module in particular. For example, an encoder of the type "Mercury 1500 P" of the producer MicroE System can be used as a linear encoder having glass scale. The scanning sensor is advantageously arranged at a distance of 2 to 3 mm, in particular 2.25 to 2.55 mm, from the glass scale.

The position encoder element can also be arranged on the driver, if it is embodied as part of the carriage or is installed fixedly thereon, in particular screwed in place. The scanning sensor is arranged in this case, in particular outside the lens tube, such that it can acquire the position code on the driver. Alternatively, the driver can also itself be embodied as a position encoder element. For example, light can be emitted in the direction of a light-sensitive scanning sensor by three light sources, wherein shadows are produced on the scanning sensor by the driver, from the position of which a linear position of the driver and therefore of the carriage is derivable.

Each position encoder element is arranged in an unchangeable spatial relationship to the optics assembly of the same carriage, in particular in that all components of a carriage, or at least the optics assembly and the components bearing the position encoder element, are connected to one another without play. It is thus possible to derive a change of the position of the optics assembly directly from the signal generated by the scanning sensor. If the spatial relationship is additionally known, an unambiguous current position of the optics assembly can also be derived.

The optics carriers of the carriages can, as described in EP 1 510 846 A1, have multiple sleeve segments, which preferably describe a circular arc of 120° or 90°, and on which sliding elements are arranged. On the one hand, this permits a long guide length in the direction of the optical axis and, on the other hand, this enables a stronger approach of the optical assemblies of the carriage to one another by sliding of the sleeve segments of adjacent carriages one inside another.

Optics carrier and lens tube are preferably manufactured from aluminum. Optics carriers and drivers can be embodied in this case, for example, as a shared component, in particular by aluminum casting, otherwise the driver can preferably be manufactured from a steel alloy. The lens tube can have openings for adjustment and maintenance work. The wall of the tube interior is preferably surface-coated to improve the guiding of the carriages. The sliding elements, which are turned for adjustment, preferably consist of a steel or copper alloy, in particular of steel or bronze.

A motor-driven pivotable shutter aperture can preferably be provided for a black adjustment.

In particular, the guide system is suitable for use in a vario-camera, in particular as part of a laser tracker. A vario-camera is understood in this case as a camera which has a zoom function, in which an enlargement stage can be set in dependence on a determined distance between camera and target, in particular so that the target can always be imaged at the same size independently of its distance.

BRIEF DESCRIPTION OF THE DRAWINGS

The camera system according to the invention will be described hereafter on the basis of schematically illustrated embodiments. Further advantages and characteristics of the invention are apparent from the following description of presently preferred embodiments in conjunction with the appended figures. In the schematic figures:

FIG. 8 shows a longitudinal section through a camera system according to the invention;

FIG. 10 shows two embodiments of a laser tracker having a camera system according to the invention.

DETAILED DESCRIPTION

Figure 1A:
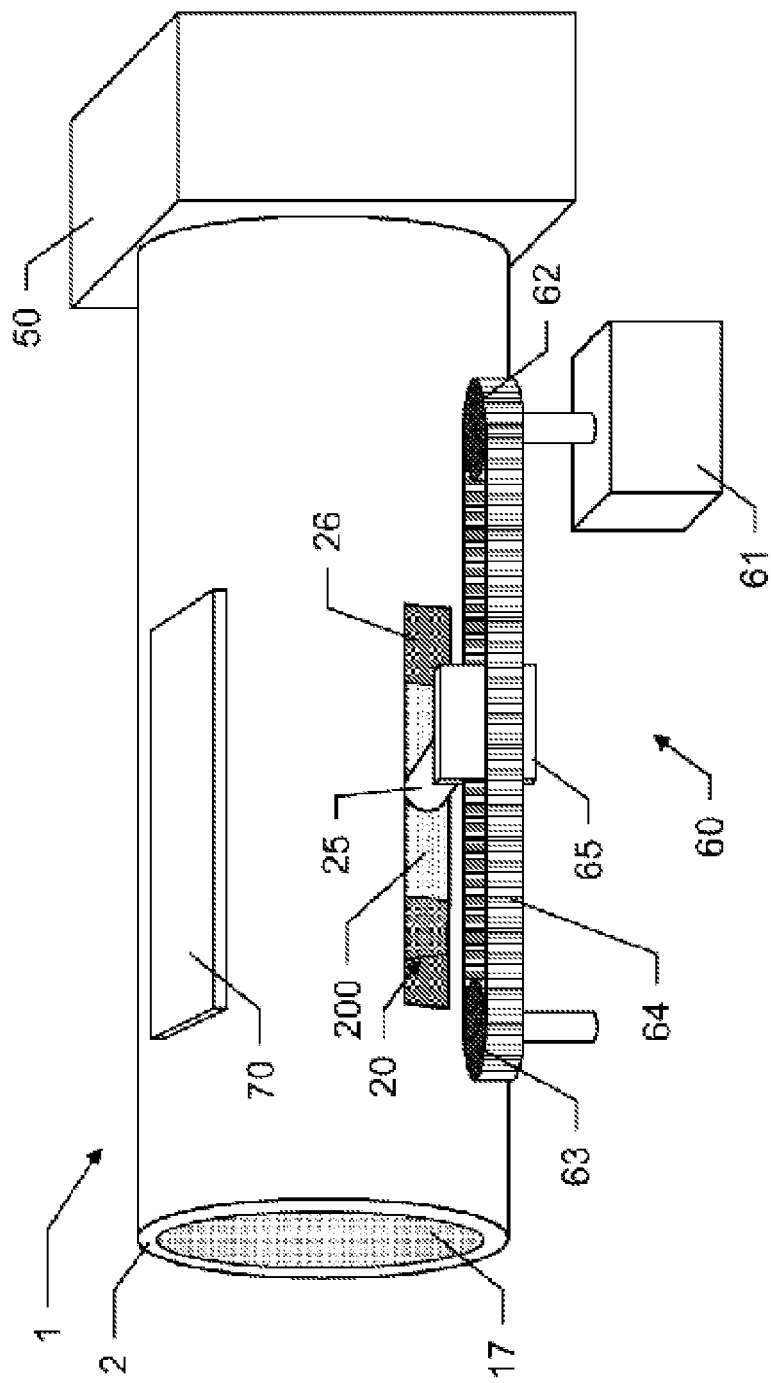
FIGS. 1a-c show a camera system according to the invention in a side view from two sides.
Figure 1B:
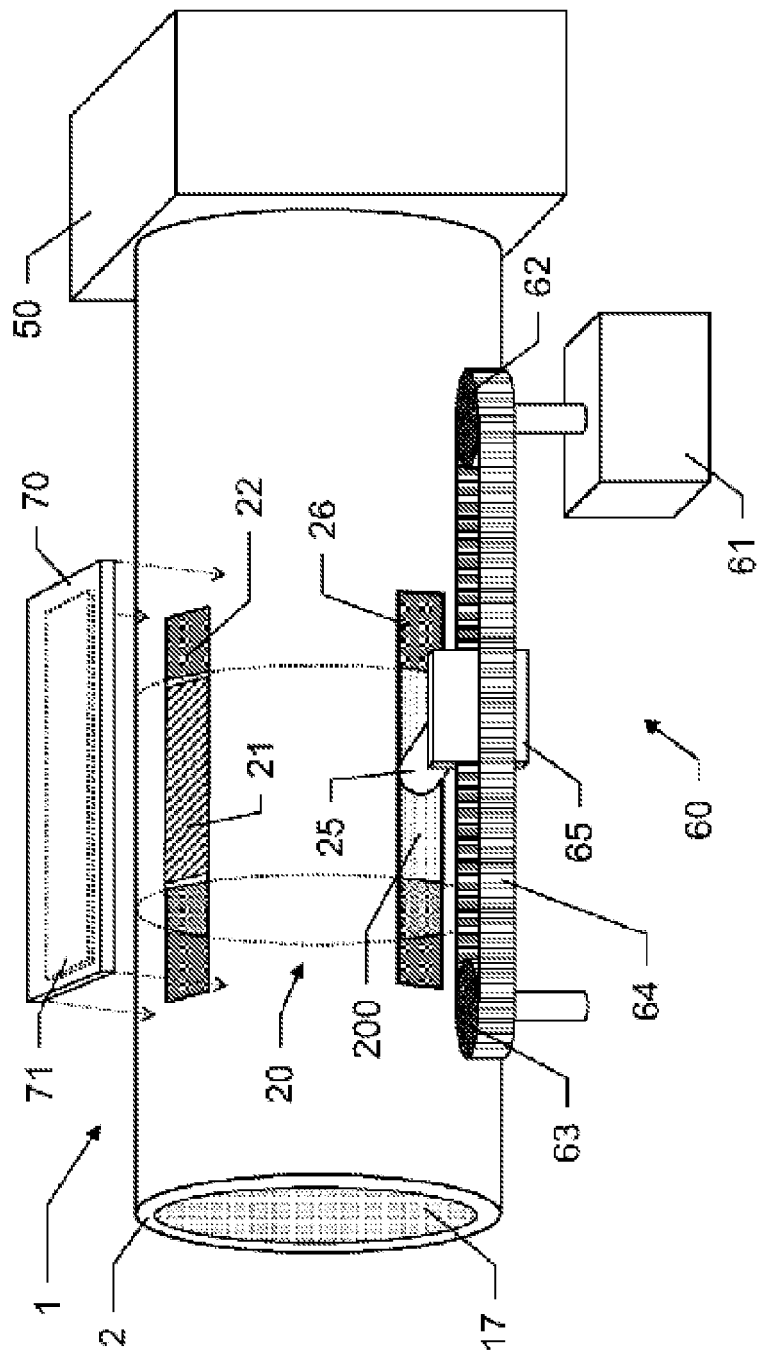
Figure 1C:
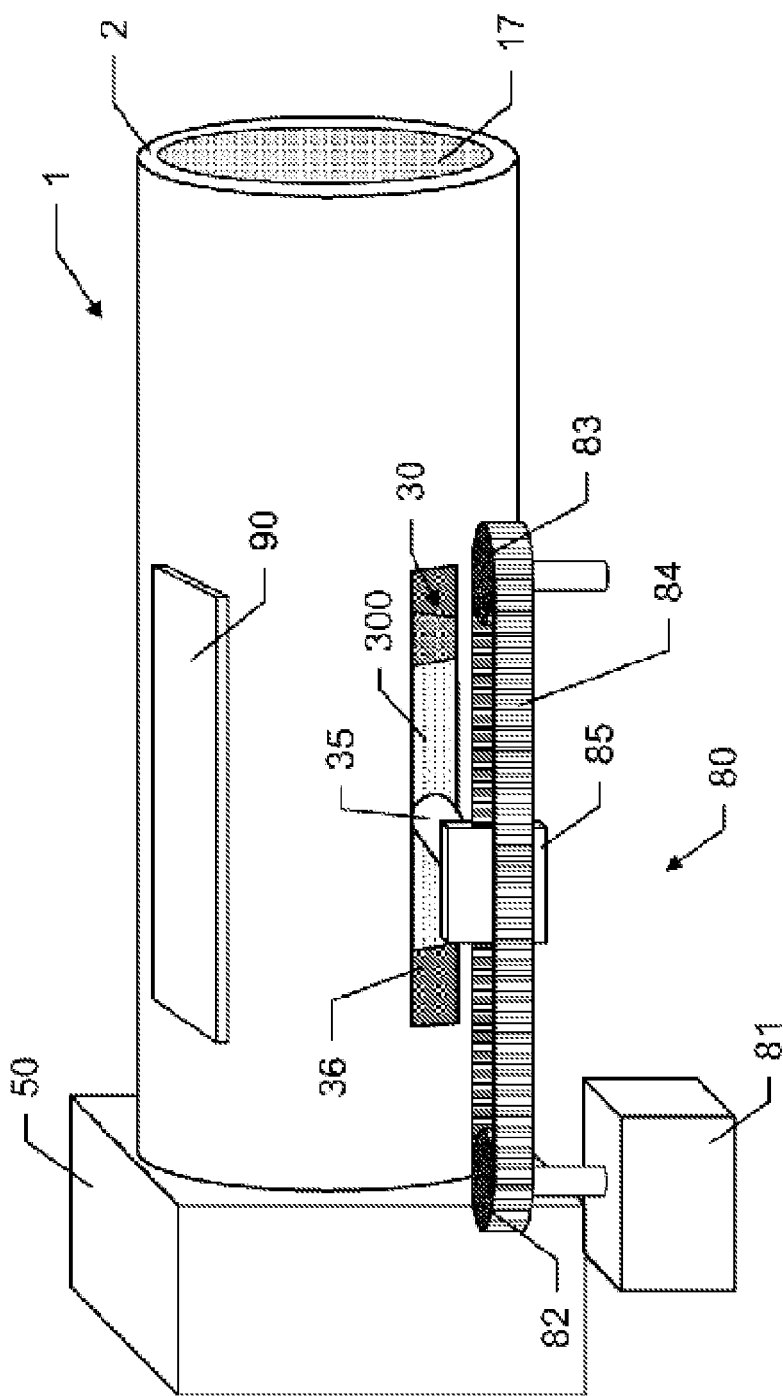

FIGS. 1a to 1c show a camera system 1 according to the invention. In this case, FIGS. 1a and 1b show the camera system 1 in a first side view and FIG. 1c shows the same camera system 1 in a view from the opposite side.

The camera system 1 according to the invention shown in FIG. 1a contains a lens tube, which has a tube body 2 and which is delimited at one end using an optical element 17 in the form of a lens and at the other end by a sensor element 50. On the outer side, the tube body 2—as shown here as an example—can assume the shape of a cylinder, but can also have the shape of a cuboid block or another shape. The interior of the lens tube (tube interior)—not shown here—defined by the tube body 2 advantageously has an essentially cylindrical shape, however.

A first carriage 20 is attached so it is linearly movable in the tube interior. The carriage 20 has an optical assembly and an optics carrier 200 and is movable by means of a drive unit 60 along the longitudinal axis of the lens tube. The drive unit 60 has a motor 61, in particular in the form of a direct-current geared motor, a deflection roller 62, which can be pre-tensioned, a further deflection roller 63, and a toothed belt 64, which is tensioned via the deflection rollers 62, 63.

A movement-transmitting element 65, which transmits the movement to the carriage 20 via a driver 25, is fastened, for example, clamped, on the toothed belt 64. To guide the driver 25, the tube body 2 has a longitudinal slot 26. For better sliding in this guide longitudinal slot 26, the driver 25 can have sliding elements (not shown).

A scanning module 70 for acquiring a position code and deriving a position of the carriage 20 is arranged on the tube body 2.

In FIG. 1b, this scanning module 70 is shown dismounted from the tube body 2 for the sake of comprehensibility. A further opening 22 is thus recognizable in the tube body 2 under the scanning module 70. On the carriage 20, the outlines of which are shown behind the wall of the tube body 2 by means of dotted lines, a position encoder element 21 is located at the height of the opening 22, for example, in the form of a glass scale, which carries a position code, which is acquirable by a scanning sensor 71 of the scanning module 70, and from which a linear position of the carriage 20 is derivable.

FIG. 1c shows the camera system 1 from the opposite side, so that a second carriage 30 in the tube interior is visible. This carriage is driven by a second drive system 80, which has a deflection roller 82, which can be pre-tensioned, a further deflection roller 83, a toothed belt 84, and a movement-transmitting element 85. The movement-transmitting element 85 transmits the movement to the carriage 30 via a driver 35, wherein the tube body 2 also has a guide longitudinal slot 36 for the driver 35 on this side. A second scanning module 90 for acquiring a position code and deriving a position of the second carriage 30 is arranged on the tube body 2.

Figure 2A:
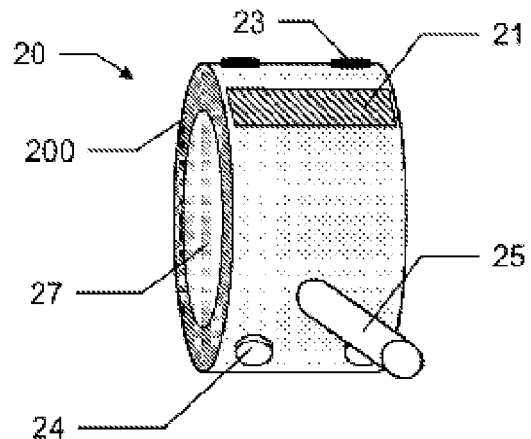
FIGS. 2a-c show a first embodiment of a carriage in a side view and in a cross section.
Figure 2B:
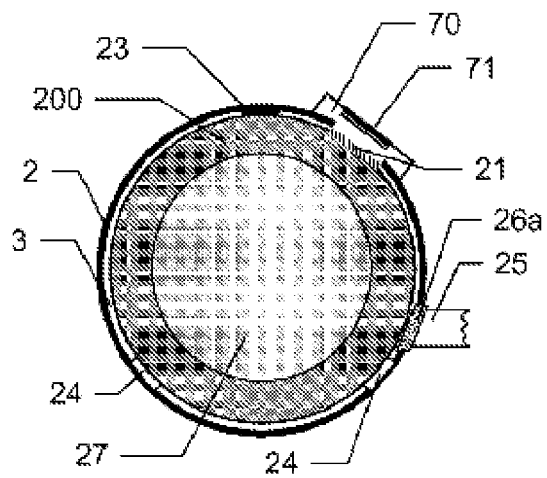
Figure 2C:
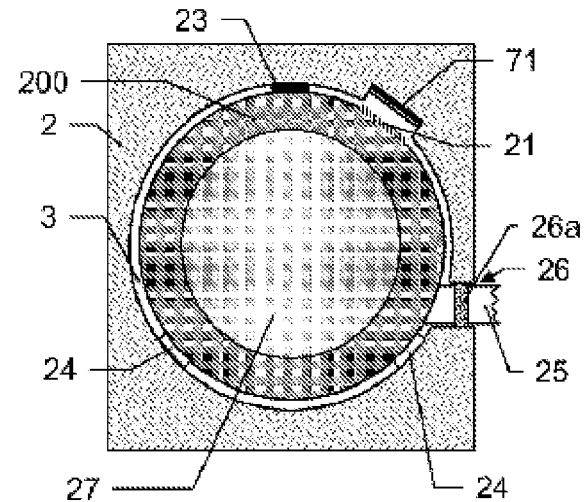

FIGS. 2a-c show an example of the construction of a carriage according to the invention on the example of the first carriage 20 from FIGS. 1a-1c. A carriage according to the invention forms a module of multiple components which are fixedly connected to one another.

FIG. 2a is a side view of the carriage 20. An optical element 27 is shown as a part of the optical assembly of the carriage in the form of a lens. The optics carrier 200 enclosing the optical assembly is preferably manufactured from aluminum. A position encoder element 21 is arranged on the optics carrier 200, which carries a position code, which is acquirable by a scanning sensor, and from which a linear position of the carriage 20 is derivable. The position encoder element 21 is in particular a glass scale and is cemented on the optics carrier 200. A driver 25 is fixedly connected to the optics carrier 200, for example, screwed thereon or embodied as a shared component, and represents a connection to a movement-transmitting element of a drive unit (not shown here). Two types of sliding elements 23, 24 are arranged on the optics carrier 200: two sliding elements 23 which can be pre-tensioned and multiple sliding elements 24 which are turned for adjustment; the latter consist in particular of steel or bronze.

FIG. 2b shows a cross section through the same carriage 20 from FIG. 2a, which is arranged in a lens tube. A pair of sliding elements 23 which can be pre-tensioned and two pairs of sliding elements 24 which are adjusted by turning ensure slide-guided mounting, without play, of the carriage 20 on the tube interior 3 in a plane perpendicular to the optical axis. The tube body 2 is manufactured from aluminum, the wall of the tube interior 3 is surface-coated to improve the guiding of the carriage.

A scanning module 70 having a scanning sensor 71 is arranged on the tube body 2. The scanning sensor 71 is embodied for the purpose of acquiring the position code of the position encoder element 21 arranged on the optics carrier 200, so that a position-dependent scanning signal, which is linked to the linear position of the first carriage 20, can be generated and a linear position of the first carriage 20 is derivable.

In FIG. 2c, the carriage 20 from FIGS. 2a and 2b is shown in an alternative tube body 2. While the tube interior 3 again has a circular cross section and is cylindrical, the tube body 2 has a square cross section and is cuboid. The scanning sensor 71 is integrated in the tube body 2 in this embodiment. In addition, the driver 25 is shown with a sliding element 26a for linear sliding in the guide longitudinal slot 26.

Figure 3:
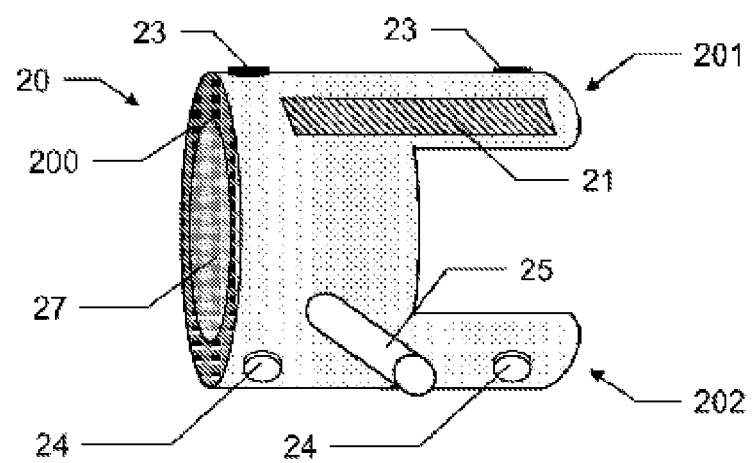
FIG. 3 shows a second embodiment of a carriage in a side view.

An alternative embodiment of the carriage 20 is shown in FIG. 3. The optics carrier 200 of the carriage 20 has in this case multiple segments 201, 202 on one side. These segments each have a sliding element 23, 24. The position encoder element 21 is partially arranged on the top segment 201.

The guide length of the carriage 20 is enlarged by the segments 201, 202 of the optics carrier 200. If, in the case of a second carriage (not shown here) arranged to the right of the illustrated carriage 20, two segments are arranged offset such that in the event of an approach of the two carriages they engage in the intermediate spaces between the segments 201, 202, the enlargement of the guide length is enabled with a uniform minimum distance between the two carriages. The number of the segments is not restricted to two. Embodiments having one segment per carriage, or having three or more segments are also possible.

Figure 4:
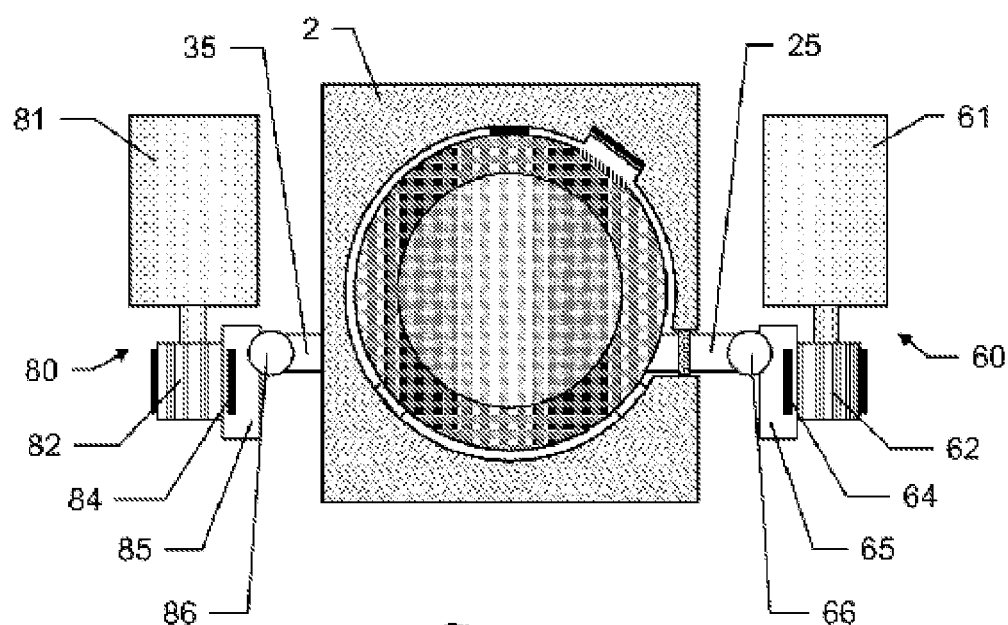
FIG. 4 shows a cross section through a lens tube and two drive units.

FIG. 4 shows the cross section through the lens tube from FIG. 2c having two drive units 60, 80 arranged laterally. The two drive units 60, 80 each have a motor 61, 81, a deflection roller 62, 82, which is drivable by this motor and can be pre-tensioned, a toothed belt 64, 84, which is tensioned around this and a further deflection roller (not shown here), and a movement-transmitting element 65, 85 clamped thereon. A driver 25, 35 as part of a carriage is attached in each case to the movement-transmitting elements 65, 85 via a ball joint 66, 86.

Figure 5A:
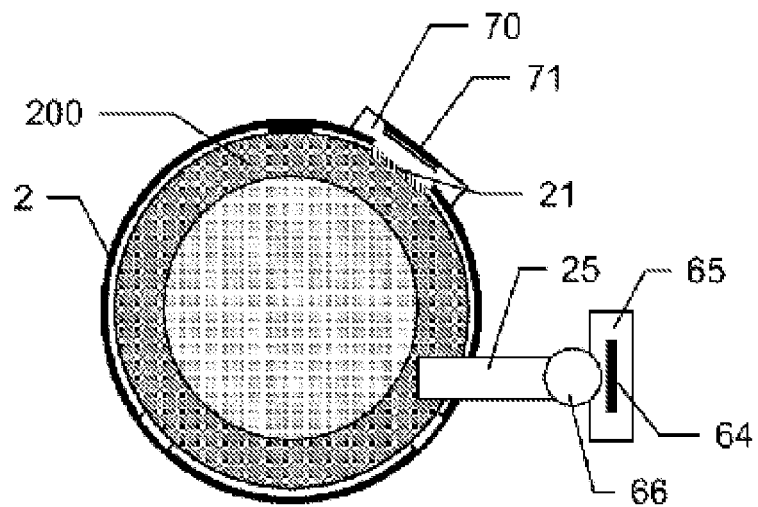
FIGS. 5a-c show a first embodiment of the driver.
Figure 5B:
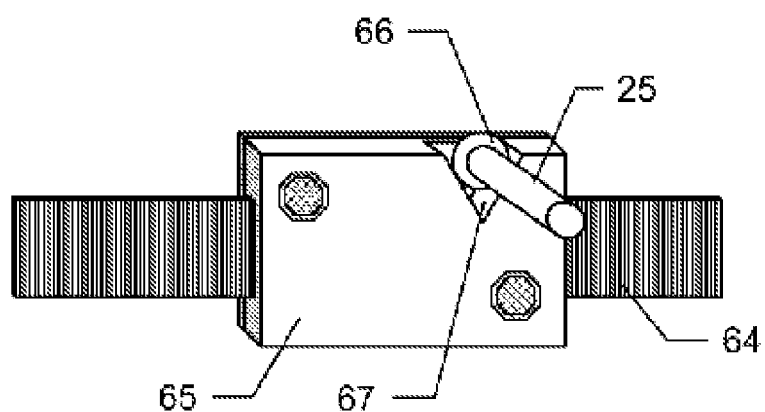
Figure 5E:
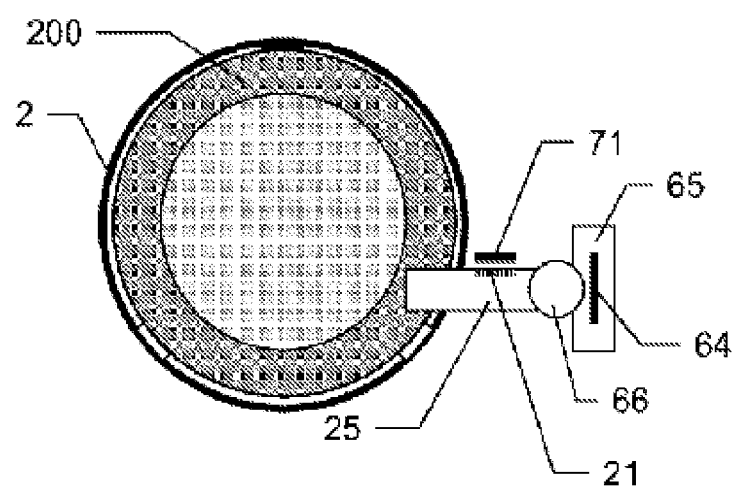

FIGS. 5a-c show, in a cross section of the carriage 20 from FIG. 2b, a first embodiment of the driver 25 and its suspension on the movement-transmitting element 65.

FIG. 5a shows a first embodiment of the driver 25. It is embodied as part of the carriage 20 therein. For this purpose, it is fixedly connected to the optics carrier 200, in particular screwed into the optics carrier 200 or manufactured by aluminum casting as a shared part with the optics holder. The driver 25 is connected via a ball joint 66 to the movement-transmitting element 65 fastened on the toothed belt 64.

FIG. 5b shows an exemplary fastening of the first embodiment of the driver 25 on the movement-transmitting element 65. The movement-transmitting element 65 is clamped onto the toothed belt 64 and has a V-shaped bearing 67, in which the ball joint 66 fastened on the driver 25 is fixed in the correct position.

FIG. 5c shows a variant of the first embodiment of the driver 25. In this variant, the position encoder element 21 is arranged on the driver 25 and the scanning sensor 71 is in corresponding position. Because the driver 25 is embodied as part of the carriage 25 and is connected without play to the optics carrier 200, a linear position of the carriage 20 can be derived from a linear position of the driver 25.

Figure 6:
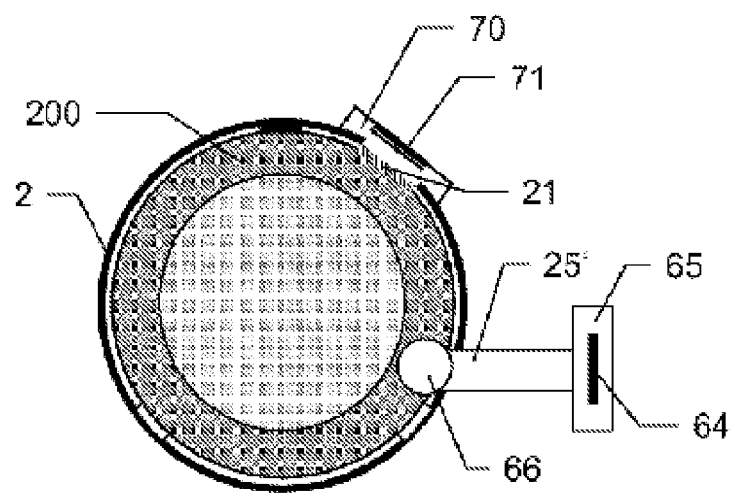
FIG. 6 shows a second embodiment of the driver.

FIG. 6 shows a second embodiment of the driver 25'. The driver 25' is fixedly connected to the movement-transmitting element 65 therein, in particular screwed on or manufactured from one piece. The driver 25' is connected via a ball joint 66 to the carriage 20.

Figure 7A:
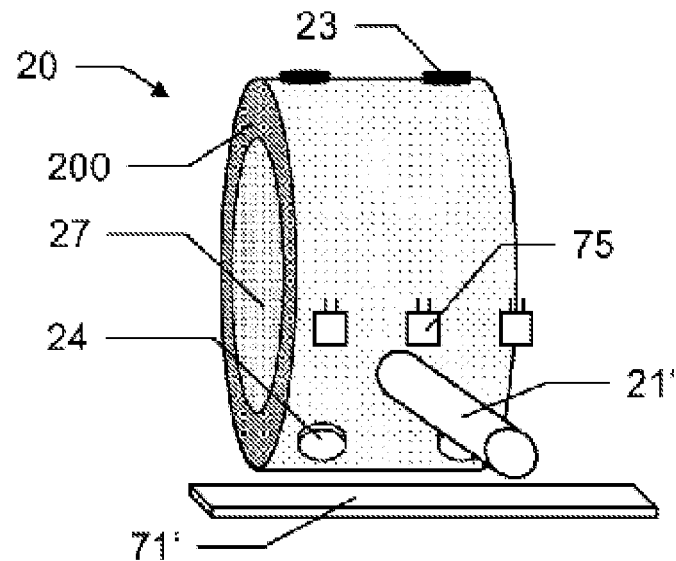
FIGS. 7a-b show an alternative embodiment of the encoder with a driver as a position encoder element.
Figure 7B:
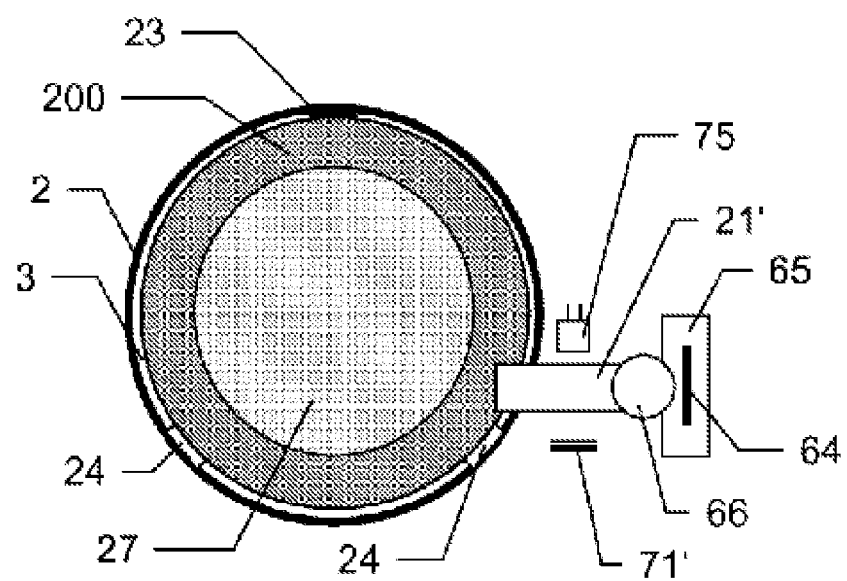

A further variant of the driver is shown in FIGS. 7a and 7b. The driver, which is connected without play to the optics carrier 200, functions in this case as a position encoder element 21'. Three light sources 75 are arranged above the position encoder element 21', opposite to a light-sensitive scanning sensor 71', along the direction of the displaceability of the carriage 20. The three light sources 75 emit light onto the scanning sensor 71', wherein the driver, as the position encoder element 21', throws three shadows on the scanning sensor 71', which are acquirable thereby. From the position of the three shadows, a position of the position encoder element 21' can be derived, and therefore a position of the carriage 20.

FIG. 8 shows a longitudinal section through a camera system 1 according to the invention. The tube body 2 defines a tube interior 3 and an optical axis 4. A sensor module 50 having an optical sensor 51 for receiving optical radiation is arranged at the end of the lens tube.

Fixed and movable optical assemblies are arranged solely as examples along the optical axis 4 in the tube interior 3. At the front end of the lens tube, a first fixed optical assembly 10 having two optical elements 17, 18 is connected to the tube body 2, at the rear end of the lens tube, a second fixed optical assembly 40 having an optical element 41 is attached. The two fixed optical assemblies 10, 40 are preferably adjustable.

Between the two fixed optical assemblies 10, 40, two carriages 20, 30 are mounted so they are movable by means of sliding elements 23, 33 along the optical axis 4. The first carriage 20 and the second carriage 30 each have an optics group, which is arranged in an optics carrier 200, having three optical elements 27-29, 37-39. In each case two sliding elements 23, 33 can be pre-tensioned by means of a pre-tension element 23a, 33a arranged on the optics carrier 200. The optical elements are shown solely symbolically and can have various forms known to a person skilled in the art.

Figure 9A:
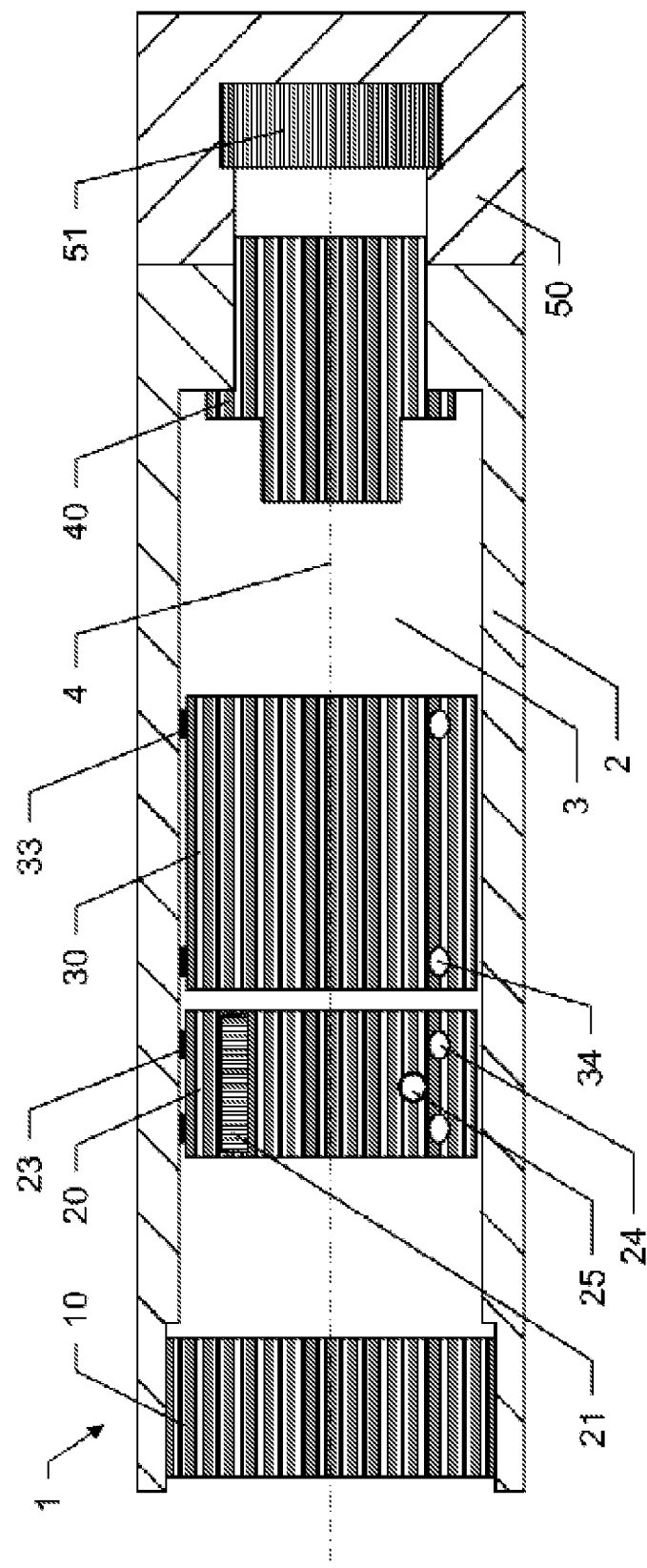
FIGS. 9a-b show a longitudinal section through the lens tube of a camera system according to the invention having exposed carriages and optical assemblies.
Figure 9B:
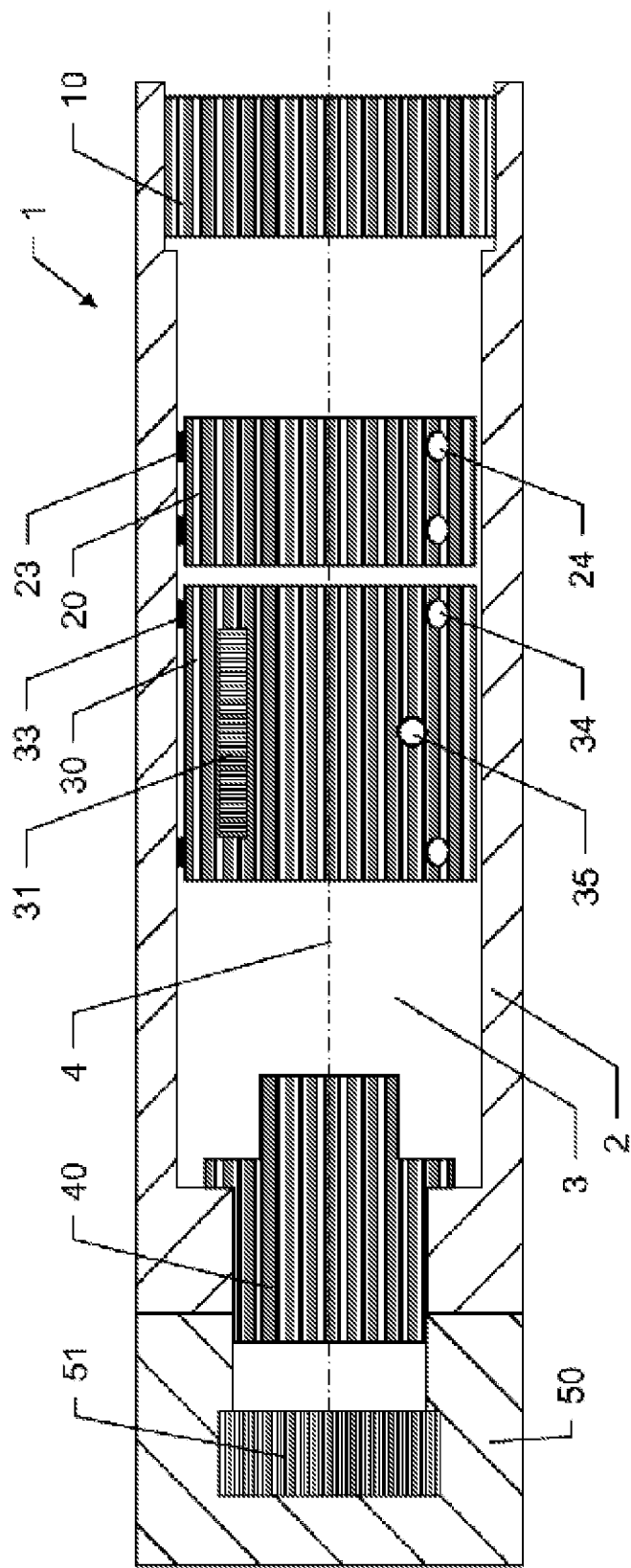

A longitudinal section through the tube body 2 is shown in FIGS. 9a and 9b, wherein the carriages 20, 30, which are arranged in the tube interior 3, and fixed optical assemblies 10, 40 are shown in each case from two sides in a side view. The carriages 20, 30 each have, on the optics carrier 200, a position encoder element 21, 31, a driver 25, 35, and a pair of sliding elements 23, 33, which can be pre-tensioned, and two pairs of sliding elements 24, 34, which are adjusted by turning.

FIG. 10 shows two different embodiments of a laser tracker 100, 110 as an example for the application of a camera system according to the invention. In addition, a measuring aid instrument 120 is shown, embodied here as a tactile measuring device.

Both laser trackers 100, 110 have an image acquisition unit, which is embodied in particular as a camera system according to the invention, or has a camera system according to the invention.

The first laser tracker 100 has a base 104 and a support 103, wherein the support 103 is arranged so it is pivotable or rotatable in relation to the base 104 about a pivot axis 5 defined by the base 104. In addition, a targeting unit 102 is arranged on the support 103 such that the targeting unit 102 is pivotable in relation to the support 103 about an inclination axis (transit axis). By way of an alignment capability of the targeting unit 102, which is thus provided around two axes, a laser beam 6 emitted by the targeting unit 102 can be flexibly aligned and therefore targets can be targeted. The pivot axis 5 and the inclination axis are arranged essentially orthogonally to one another for this purpose, i.e., slight deviations from exact axis orthogonality can be predetermined and stored in the system, for example, to compensate for measurement errors thus resulting.

In the arrangement shown, the laser beam 6 is oriented on a reflector 121 on the measuring aid instrument 120 and is retroreflected thereon back to the laser tracker 100. By means of this measurement laser beam 6, a distance to the reflector 121 can be determined, in particular by means of runtime measurement, by means of the phase measurement principle, or by means of the Fizeau principle. The laser tracker 100 has a fine distance measuring unit, for determining this distance between the tracker 100 and the reflector 121, and angle meters, which acquire a position of the targeting unit 102, by means of which the laser beam 6 can be aligned and guided in a defined manner, and thus make it possible to determine a propagation direction of the laser beam 6.

In addition, the laser tracker 100, in particular the targeting unit 102, has an image acquisition unit for the purpose of position determination of sensor exposure on a sensor or in an acquired image of a CMOS or is implemented in particular as a CCD camera or pixel sensor array camera. Such sensors permit a position-sensitive detection of acquired exposure on the detector. Furthermore, the measuring aid instrument 120 has a tactile sensor, the contact point 123 of which can be brought into contact with a target object to be surveyed. While this contact exists between the scanning tool 120 and the target object, a position of the contact point 123 in space and therefore the coordinates of a point on the target object can be exactly determined. This determination is performed by means of a defined relative positioning of the contact point 123 to the reflector 121 and to markings 122 arranged on the measuring aid instrument 120, which can be implemented as light-emitting diodes, for example. Alternatively, the markings 122 can also be implemented such that they reflect the incident radiation in the event of illumination, for example, with radiation of a defined wavelength (auxiliary point markings 122 implemented as retroreflectors), in particular display a specific lighting characteristic, or they have a defined pattern or color coding. An orientation of the scanning tool 120 can therefore be determined from the location or distribution of the markings 122 in an image acquired using the sensor of the image acquisition unit.

The second laser tracker 110 has a beam guiding unit 116 separate from the image acquisition unit 115 for emitting a second laser beam 7, which is also aligned on the reflector 121. Both the laser beam 7 and also the image acquisition unit 115 are pivotable by motors in each case about two axes and can thus be aligned such that by means of the image acquisition unit 115, the target 121 targeted using the laser beam 117 and the markings 122 of the measuring aid instrument 120 can be acquired. A precise distance to the reflector 121 and an orientation of the instrument 120 can therefore also be determined here on the basis of the spatial location of the markings 122.

For the respective alignment of the laser beams 6, 7 on the reflector 121, in each case illumination means for illuminating the reflector 121 with radiation of a specific wavelength, in particular in the infrared wavelength range, are provided on the laser trackers 100, 110, and additionally at least two cameras having position-sensitive detectors are arranged on each tracker 100, 110. The illumination radiation, which is reflected on the reflector 121 and backscattered to the laser trackers 100, 110, can be detected by means of the camera and a position of the reflector 121 on the respective detector can be imaged using each of the position-sensitive detectors. Therefore, both using the first laser tracker 100 and also using the second laser tracker 110, two imaged positions of the reflector can be determined and, in dependence on these imaged target positions, the target (reflector 121) can be found—for example, according to generally known principles of photogrammetry—and the targeting unit 102 or the beam guiding unit 116 can be aligned such that the target is targeted using the measurement beam 6, 7.

In addition, on the basis of each of the two images of a laser tracker 100, 110, a coarse position of the reflector can be determined in each case. This position can be determined according to general geometric or trigonometric principles, for example, according to geometric design principles of triangles or by means of the law of sines and/or cosines. In addition, generally known methods of photogrammetry (stereo photogrammetry) can be used for the coarse position determination. For this purpose, the relative positions and in particular alignments of the cameras on the respective tracker 100, 110 to one another are additionally known.

The illumination means and the cameras can be arranged in this context, for example, on the image acquisition unit 115, the beam guiding unit 116, the targeting unit 102, the support 103, or the base 104, in defined positions in each case.

By means of the knowledge of the positioning of the cameras in relation to an emission direction of the respective laser beam 6, 7, the laser beam 6, 7 can be aligned on the ascertained coarse position of the reflector 121 and coupled thereon (lock-on). Thus, in spite of a design-related offset of the laser emission direction to the acquisition directions of the cameras, a rapid alignment of the respective beam 6, 7 can be performed and a parallax provided by optical axes of the cameras and the laser beam 6, 7 can be resolved. Especially, the laser beam 6, 7 can be aligned on the target 121 directly, i.e., without an iterative intermediate step.

In particular—alternatively or additionally to the determination of the coarse position of the reflector 121—a coarse distance to the reflector 121 can be determined from the target positions which are acquired and imaged on the detectors (on a laser tracker 100, 110). This determination can also be performed by means of generally valid geometric principles, for example, by means of the geometric structural principles of triangles and/or by means of the law of sines and/or cosines.

It is obvious that these illustrated figures only schematically illustrate possible exemplary embodiments. The various approaches can also be combined with one another and also with methods and devices of the prior art.

What is claimed is:

1. A laser tracker adapted to track a target and comprising a camera system for imaging said target, comprising a zoom lens for use in a surveying device, the camera system comprising:

a tubular guide system having a tube body, which defines a tube interior having an interior surface and an optical axis, wherein the tube includes a first guide longitudinal slot, a sensor module, which is arranged downstream from the guide system, having an optical sensor for acquiring optical radiation, at least one first carriage on the tube interior surface, each first carriage comprises an optics carrier holding at least one optical element, an elongate driver coupled with the optics carrier, and a first position encoder element on the optics carrier or on the elongate driver
        wherein each first carriage is arranged so it is linearly movable in the tube interior along the optical axis by the first driver extending through the first guide longitudinal slot and is mounted by a slide-guided mounting of a sliding element of the first carriage being on the tube interior surface of the tube body, wherein the first carriage is linearly movable essentially without play in a plane through the tube body perpendicular to the optical axis, and a first drive system that is outside the tubular body and coupled to the driver for moving the first carriage along the optical axis, and a first scanning sensor positioned for the acquisition of a position of the first position encoder element such that a position-dependent first scanning signal, which is linked to the linear position of the first carriage, can be generated, so that a linear position of the first carriage is derivable, and wherein the laser tracker is adapted to track the target by means of a measurement laser beam emitted onto a retroreflector of the target and to determine a distance to the target using the measurement laser beam.

2. The laser tracker as claimed in claim 1, wherein the optics carrier has an outside surface with at least two sliding elements protruding therefrom and in contact with the tube interior for the mounting of the first carriage without play, wherein at least one of the at least two sliding elements is turned for adjustment.

3. The laser tracker as claimed in claim 1, wherein the first position encoder element is arranged on the optics carrier, wherein the first scanning sensor for acquiring the first position encoder element is positioned at a first acquisition opening of the tube body, and/or is embodied as a glass scale.

4. The laser tracker as claimed in claim 3, wherein the at least one fixed optical assembly is embodied as:
a first fixed optical assembly having at least one optical element, which is attached at the entry of the tube interior, and/or
a second fixed optical assembly having at least one optical element, which is attached on the end of the tube interior facing toward the sensor module.

5. The laser tracker as claimed in claim 1, further comprising at least one fixed optical assembly having in each case at least one optical element, which is arranged in the tube interior along the optical axis.

6. The laser tracker as claimed claim 1, wherein the first drive system comprises:
a first motor, and
a first movement transmitting element, wherein
the first driver forms a connection between the first movement-transmitting element and the first carriage, the first driver is installed both on the first movement-transmitting element and also on the first carriage.

7. The laser tracker as claimed in claim 6, wherein the first motor is a direct-current motor.

8. The laser tracker as claimed in claim 7, wherein:
the first position encoder element is arranged on the first driver, and/or
the first driver is embodied as the first position encoder element.

9. The laser tracker as claimed in claim 6, wherein the first driver is perpendicular to the optical axis.

10. The laser tracker as claimed in claim 6, wherein the first drive system further comprises:
a first deflection roller, which is rotatable by the first motor, and which can be pre-tensioned; and
a first belt movable by a rotation of the first deflection roller, wherein the first movement-transmitting element is fastened on the first belt.

11. The laser tracker as claimed in claim 6, wherein the first belt comprises a toothed belt.

12. The laser tracker as claimed in claim 6, wherein the first driver is part of the first carriage and is connected without play to the optics carrier.

13. The laser tracker as claimed in claim 6, wherein the first driver
is connected via a first ball joint or is operationally linked by means of magnetic attraction forces to the first carriage.

14. The laser tracker as claimed in claim 6, wherein the first driver is screwed onto the optics carrier.

15. The laser tracker as claimed in claim 1, wherein the optics carrier comprises aluminum and/or is cylindrical, and/or the optical element comprises a lens or a lens group.

16. The laser tracker as claimed in claim 1, further comprising:
a second carriage, which has an optical assembly having at least one optical element and an optics carrier, is arranged so it is linearly movable in the tube interior along the optical axis, and is mounted essentially without play in a plane through the tube body perpendicular to the optical axis,
a second drive system for moving the second carriage along the optical axis,
a second position encoder element arranged on the second carriage, and
a second scanning sensor for acquiring the second position encoder element such that a position-dependent scanning signal, which is linked to the linear position of the second carriage, can be generated, so that a linear position of the second carriage is derivable.

17. The laser tracker as claimed in claim 1, wherein the optical sensor is embodied as a CMOS sensor, as a CCD sensor, or as a pixel array sensor.

18. The laser tracker as claimed in claim 1, wherein the enlargement stage is set in dependence on the distance to the target that is determined using the measurement laser beam.

19. The laser tracker as claimed in claim 1, wherein the zoom lens has a zoom function, in which an enlargement stage is set in dependence on a distance between the camera system and the target determined by the laser tracker.

20. The laser tracker as claimed in claim 1, wherein the optics carrier has an outside surface with at least two sliding elements protruding therefrom and in contact with the tube interior.

21. The laser tracker as claimed in claim 1, wherein the optics carrier has an outside surface with at least three sliding elements located in a plane perpendicular to the optical axis.

* * * * *